UNITED STATES PATENT OFFICE.

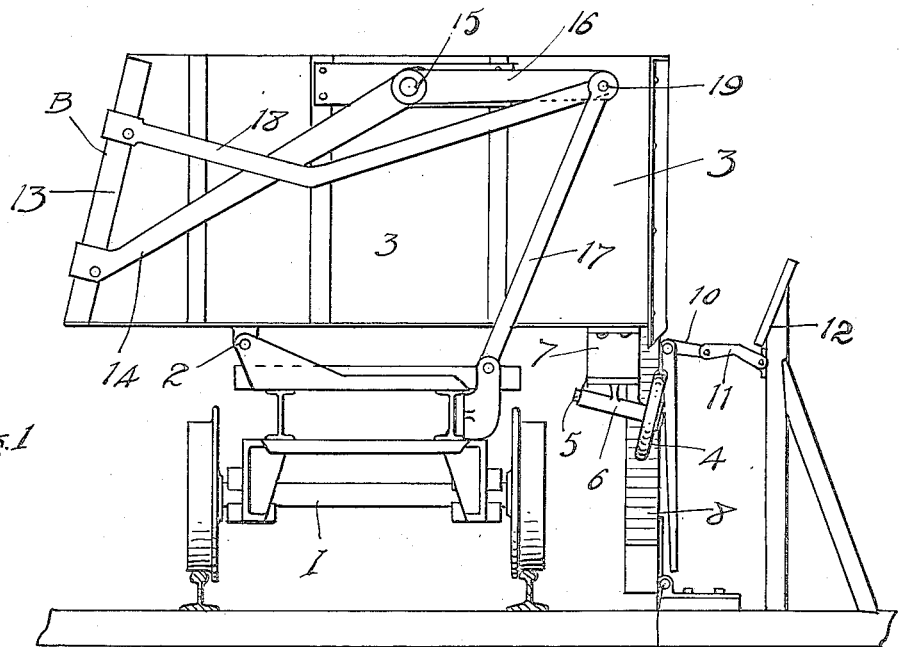
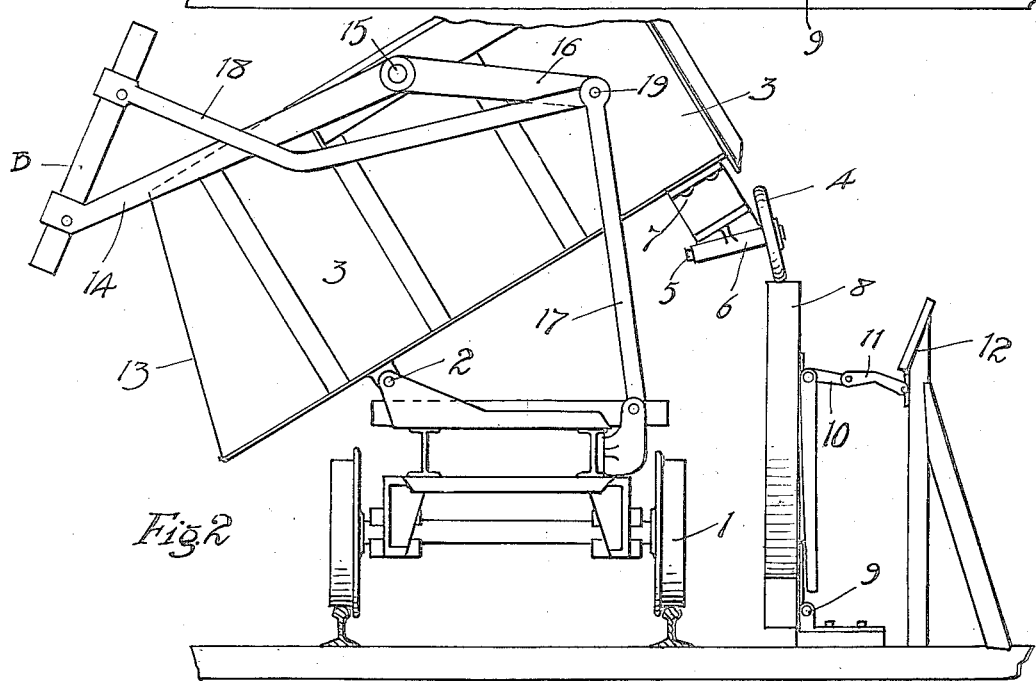
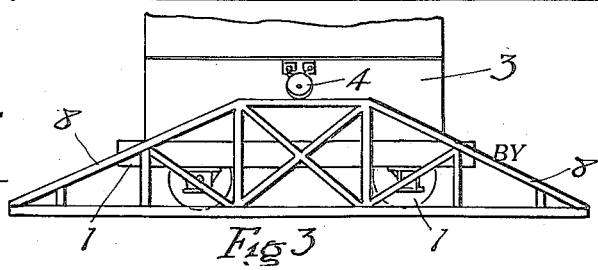

FRANCIS KNOTT, OF PHOENIX, BRITISH COLUMBIA, CANADA.

DUMPING-CAR.

No. 917,313.  Specification of Letters Patent.  Patented April 6, 1909.

Application filed November 21, 1907. Serial No. 403,108.

*To all whom it may concern:*

Be it known that I, FRANCIS KNOTT, a Canadian subject, residing at Phoenix, in the Province of British Columbia and Dominion of Canada, have invented new and useful Improvements in Dumping-Cars, of which the following is a specification.

The object of the present invention is to provide a car which will automatically dump its contents on arriving at a predetermined position on the car track.

In the accompanying drawing, Figure 1 is an end view of the car in its normal or closed condition; Fig. 2 is a broken similar view of the same, when dumping; Fig. 3 is a broken detail side view of the inclined frame and roller.

Referring to the drawing, 1 indicates a car truck, to one side of which is pivotally attached as shown at 2, the body 3 of the car. When the car arrives at the dumping point said car body is caused to tilt by means of an inclined frame at the side opposite to the pivotal axis of the car body, and a roller engaging said inclined frame. I preferably make the inclined frame stationary and secure the roller 4 on the side of the car body. Said roller has an axle 5 mounted in a bearing 6 supported by a hanger 7 from the side of the car body. The inclined frame 8 is arranged preferably so that it can be moved out of the path of the roller when it is not required to dump, and for this purpose said frame is pivoted at the bottom, as shown at 9 and being held in position by means of arms 10, 11, pivoted to said inclined frame and to a suitable support 12, and also to each other. As the car advances the inclined frame 8 raises the roller 4 and thereby also raises the car body on its pivots, and tilts said body to one side, to the position shown in Fig. 2.

13 indicates a side of the car, which also forms the dumping door, the ends of which, (one end only here shown) are each secured at the lower portion to an arm 14 of a lever pivoted at 15 on the body of the car, the other arm 16 of said lever being connected by a link 17 with the truck 1. The upper portion of said end is connected by a link 18 to the pivot 19 by which the link 17 is connected to the arm 16.

It will readily be seen that, as the body of the car is tilted, the above mentioned parts move into such relative positions that the side or door B of the car is moved away from the body, and the contents of the car are discharged therefrom. As the car moves farther along the track, so that the roller leaves the inclined position of the frame, the weight of the door B assists in tilting the body of the car back to its place.

It will be observed that the door or side of the car is held close to the body by the weight of the load and of the body of the car itself, since the weight of both of these acts on one side of the pivotal axis to pull the arms 14 and 18 across the car and hold the door or side 13 of the car close to the body.

The side 13 of the car is preferably sloped in the manner shown, so as to reduce the force required to raise the body of the car. By so sloping said side, the result is obtained that said side recedes from the ore as it rises, thus lessening the friction between itself and the ore.

I claim:—

1. A dumping car comprising a truck, a car body pivoted to said truck on one side thereof, and means carried by the carbody on its opposite side to the pivot and arranged to engage a stationary device near the track to raise said side of the car body relatively to said truck, at the opposite side, substantially as described.

2. A dumping car comprising a truck, a car body pivoted to said truck on one side thereof, means carried by the car body on its opposite side to the pivot and arranged to engage a stationary device near the track to raise said side of the car body relatively to said truck, and discharge the contents at the opposite side, a side or door movably secured at said latter side, and means automatically operated in said raising of the car body for opening said side or door from said body, substantially as described.

3. A dumping car comprising a truck, a car body pivoted to said truck, a roller carried by said car body at a side thereof, and arranged to engage an inclined part of a frame at the side of the track to tilt the car body relatively to said truck, a door closing the other side of the car body, and means for automatically opening said door when the body is so tilted, substantially as described.

4. In a dumping car, the combination of a truck, a car body supported and pivoted thereon on a longitudinal axis, whereby the body can be tilted relatively to said truck, and means carried by said car body at one side of said pivot arranged to impinge upon a device adjacent to the truck and conformed to so tilt said car body relatively to said truck by the engagement of said means, with said device in the forward motion of the car, substantially as described.

5. In a dumping car, the combination of a truck, a car body supported and pivoted thereon on a longitudinal axis, whereby the body can be tilted relatively to said truck, means carried by said car body at one side of said pivot arranged to impinge upon a device adjacent to the track and conformed to so tilt said car body relatively to said truck by the engagement of said means, with said device in the forward motion of the car, a door arranged to close the other side of the car body, and means automatically operated by the tilting of the car body to open said door, substantially as described.

In testimony whereof I have hereunto set my hand in the presence of two subscribing witnesses.

FRANCIS KNOTT.

Witnesses:
 MELVIN M. STEPHENS,
 D. J. MATHESON.